(12) United States Patent
Goupil et al.

(10) Patent No.: US 9,116,520 B2
(45) Date of Patent: Aug. 25, 2015

(54) AUTOMATIC ESTIMATION PROCESS AND DEVICE FOR A FLIGHT PARAMETER VECTOR IN AN AIRCRAFT, AS WELL AS DETECTION METHODS AND ASSEMBLIES FOR A FAILURE AFFECTING SUCH A VECTOR

(75) Inventors: Philippe Goupil, Beaupuy (FR); Florian Cazes, Anglet (FR); Rémy Dayre, Pibrac (FR); Hervé Le Berre, Leguevin (FR); Corinne Mailhes, Toulouse (FR); Marie Chabert, Toulouse (FR); Patrice Michel, Merville (FR)

(73) Assignee: Airbus Operations (SAS), Toulouse Cedex (FR)

( * ) Notice: Subject to any disclaimer, the term of this patent is extended or adjusted under 35 U.S.C. 154(b) by 463 days.

(21) Appl. No.: 13/492,120

(22) Filed: Jun. 8, 2012

(65) Prior Publication Data

US 2013/0030610 A1    Jan. 31, 2013

(30) Foreign Application Priority Data

Jul. 26, 2011    (FR) .................................... 11 02330

(51) Int. Cl.
*G01C 23/00* (2006.01)
*G05D 1/00* (2006.01)

(52) U.S. Cl.
CPC .................................... *G05D 1/0077* (2013.01)

(58) Field of Classification Search
CPC .................................... G05D 1/0077
See application file for complete search history.

(56) References Cited

U.S. PATENT DOCUMENTS

| 4,312,041 | A  | * | 1/1982  | DeJonge ........................ 701/123 |
| 4,829,441 | A  | * | 5/1989  | Mandle et al. .................. 702/96 |
| 6,133,867 | A  | * | 10/2000 | Eberwine et al. ............... 342/29 |
| 6,175,807 | B1 | * | 1/2001  | Buchler et al. ................ 701/501 |
| 6,469,640 | B2 | * | 10/2002 | Wyatt ............................ 340/975 |
| 7,006,032 | B2 | * | 2/2006  | King et al. ..................... 342/29 |
| 7,010,398 | B2 | * | 3/2006  | Wilkins et al. .................... 701/3 |
| 7,702,427 | B1 | * | 4/2010  | Sridhar et al. .................... 701/4 |
| 7,826,971 | B2 | * | 11/2010 | Fontaine et al. ............. 701/301 |
| 7,899,586 | B2 | * | 3/2011  | Markiton et al. ............... 701/16 |

(Continued)

FOREIGN PATENT DOCUMENTS

| DE | 102009061036 | 4/2011 |
| EP | 0840225      | 5/1998 |
| FR | 2936067      | 3/2010 |

OTHER PUBLICATIONS

French Patent Office, Preliminary Search Report for FR 1102330, May 10, 2012 (2 pgs.).

*Primary Examiner* — Jonathan L Sample
(74) *Attorney, Agent, or Firm* — Wood Herron & Evans, LLP (57) ABSTRACT

Embodiments of the disclosure include methods and devices in which a flight parameter vector for an aircraft is automatically estimated and then compared to a threshold to determine whether the flight parameter vector is accurate. The detection device estimates a coefficient vector in an observation window, calculates an estimated flight parameter value, and minimizes an error associated with the observation window when calculating the estimated flight parameter value of the flight parameter vector. Comparisons may be performed by a failure detector or a flight control computer to determine failures impacting the flight parameter vector.

13 Claims, 4 Drawing Sheets

(56) References Cited

U.S. PATENT DOCUMENTS

| | | | |
|---|---|---|---|
| 8,165,734 B2* | 4/2012 | Wachenheim et al. | 701/7 |
| 8,290,696 B1* | 10/2012 | Sridhar et al. | 701/120 |
| 8,380,473 B2* | 2/2013 | Falangas | 703/8 |
| 8,527,941 B2* | 9/2013 | Clark | 717/105 |
| 8,706,460 B2* | 4/2014 | Falangas | 703/8 |
| 8,744,813 B2* | 6/2014 | Lacaille et al. | 703/2 |
| 2003/0216896 A1* | 11/2003 | Betts et al. | 703/2 |
| 2003/0222887 A1* | 12/2003 | Wilkins et al. | 345/618 |
| 2005/0096873 A1* | 5/2005 | Klein | 702/184 |
| 2005/0156777 A1* | 7/2005 | King et al. | 342/29 |
| 2006/0149713 A1* | 7/2006 | Walker | 707/3 |
| 2007/0145191 A1* | 6/2007 | Smith et al. | 244/136 |
| 2009/0043433 A1* | 2/2009 | Markiton et al. | 701/15 |
| 2010/0152927 A1* | 6/2010 | Sacle et al. | 701/3 |
| 2010/0318336 A1* | 12/2010 | Falangas | 703/8 |
| 2011/0208374 A1* | 8/2011 | Jayathirtha et al. | 701/5 |
| 2012/0101794 A1* | 4/2012 | Gojny et al. | 703/8 |
| 2012/0158220 A1* | 6/2012 | Accardo et al. | 701/15 |
| 2013/0013132 A1* | 1/2013 | Yakimenko | 701/3 |
| 2013/0030610 A1* | 1/2013 | Goupil et al. | 701/3 |

* cited by examiner

AUTOMATIC ESTIMATION PROCESS AND DEVICE FOR A FLIGHT PARAMETER VECTOR IN AN AIRCRAFT, AS WELL AS DETECTION METHODS AND ASSEMBLIES FOR A FAILURE AFFECTING SUCH A VECTOR

TECHNICAL FIELD

The present invention relates to an automatic estimation process and device for a flight vector parameter used by an aircraft system, in particular an electrical flying control system, as well as detection methods and assemblies for at least one failure affecting such a flight parameter vector.

BACKGROUND

It is known that an electrical flying control system of an aircraft, in particular an airplane, allows piloting and controlling the latter thru a flying control computer. Such a computer acquires a piloting set-point being given by the position of the control members in a manual piloting mode (with the help of a stick or a rudder bar) or by an automatic pilot in an automatic piloting mode, and it translates it into a piloting objective. Such piloting objective is then compared with the real state of the aircraft, being obtained thru measurements performed by sensors (anemometric, clinometric and inertial ones that supply the current values of the flight parameters (such as acceleration, incidence, etc.). The result is used to calculate, thru piloting laws, a position control set-point for mobile surfaces (rudders) of the aircraft. The application of a servo-control on an actuator linked to a rudder allows the latter to be adjusted in the desired position and thus to influence the aircraft trajectory.

In order to be in conformity with the navigability requirements in force, the usual solution consists in taking steps from redundant sensors into account. The implementation of such a solution implies the application of monitoring (namely to detect one or more failing information sources and to reject them) and passivation (namely to limit the effect and the propagation of a failure) principles. Calculating only one valid value and checking in parallel the whole sources constitute a so-called consolidation process.

SUMMARY

The present invention has particularly as an object to estimate at least one parameter vector (as detailed below) relative to at least one flight parameter of an aircraft, in particular to improve the availability of anemometric, clinometric and inertial data.

It relates to an automatic estimation process, in real time, of a flight parameter vector used by an aircraft system, in particular an electrical flying control system.

To this end, according to the invention, said estimation process is remarkable in that the following sequence of successive steps is automatically implemented:

(a) the values being observed (namely measured or consolidated, as further explained below) are received from a plurality of explanatory values, an explanatory value representing an aircraft parameter being used in the following processings;

(b) on an observation window, a coefficient vector is estimated, allowing a linear relationship to be determined between the flight parameter vector being searched and said explanatory values, which relationship is relative to a linear modeling by implementing a PLS (for "Partial Least Squares") regression as described in details hereinafter;

(c) such estimated coefficient vector minimizing the power of the model error on the observation window is used to calculate, thru said linear modeling, an estimated value of said flight parameter vector; and (d) the so-estimated value is transmitted to user means (with the view in particular to a consolidation and/or a detection of failures).

Therefore, thanks to the invention, as explained hereinunder, it is possible to estimate, in real time, on a quick and precise way and at reduced cost, a flight parameter vector used in the control of the aircraft, and more particularly, in the development of the piloting laws.

The implementation of the present invention does not need for new sensors or specific gauges to be installed. It can be in particular performed in a flight computer and enables to have in real time with a sufficient precision for the related application, estimations of some flight parameters available.

It is to be noticed that:

the flight parameter vector being estimated according to the present invention can be used in addition to the measured or calculated values of such flight parameter; and the estimation according to the invention, which supplies information being available in real time, can in particular be used by consolidation means to extend the availability of the flight parameter(s) being considered.

In the framework of the present invention:

said observation window is relative to a plurality of successive samples, the data being processed in a periodic way, each successive value of a same flight parameter being considered representing one sample;

a flight parameter vector comprises at least one value of said flight parameter. Such flight parameter vector can comprise a plurality of successive samples of such value (according to the observation window). Such flight parameter vector can also comprise a plurality of values of said flight parameter coming from a plurality of different information sources (sensors, consolidation means) of the aircraft. In such a case, if N samples are considered, it is defined as a matrix. Such flight parameter vector can also comprise a plurality of flight parameters.

In a particular embodiment, the operations b) and c) are iteratively performed by using the PLS regression and observed values (i.e. measured or possibly consolidated) of said flight parameter vector.

The invention thus anticipates estimating at least one flight parameter y thru q different flight parameters $(x_1, x_2, \ldots, x_q)$, so-called explanatory variables. In other words, let us consider a system with at least one output (the flight parameter y to be estimated) and q inputs $(x_1, x_2, \ldots, x_q)$, said explanatory variables. The inputs and the outputs are observed on a finite horizon of N samples (the flying control computers being aimed at being digital). The observation window is denoted $F_n = [n-N+1, \ldots, n]$, n being the current sampling time. Said parameter y to be estimated can also be a consolidated parameter. Also, the explanatory variables $x_i (i=1, \ldots, q)$ collected into the matrix $$x = \begin{bmatrix} x_1(1) & \cdots & x_q(1) \\ \vdots & \ddots & \vdots \\ x_1(N) & \cdots & x_q(N) \end{bmatrix}$$

can also be consolidated variables.

It is tried to establish a linear relationship between the flight parameter and the explanatory variables, i.e. it is tried to find a coefficient vector $b[b_1 \ldots b_q]^T$ such that $$y = Xb + e$$

wherein e, a vector of N lines, represents the model error being also called reconstruction error and the superscript IT "" indicates the transpose of the vector.

The estimation is implemented on the observation window $F_n$ and leads to an estimated coefficient vector $b(n)=[b_1(n) \ldots b_q(n)]^T$ thereby minimizing the error power on the observation window and verifying:

$$y(n) = X(n)b(n) + e(n)$$

wherein $e(n) = [e(n)e(n-1) \ldots e(n-N+1)]^T$

It is to be noticed that such modeling principle can apply, for a same flight parameter, to each of the sensors providing observations of such parameter.

Furthermore, advantageously, in a particular embodiment, a further input variable, so-called adjusting input is used so as to be able to consider non centred signals, and more generally any non modelled uncertainty, as further detailed below.

The present invention also relates to a first automatic detection method for an automatic detection of at least one failure affecting at least one flight parameter vector used by an aircraft system, in particular an electrical flying control system.

According to the invention, such first method is remarkable in that the following sequence of successive steps is performed on an automatic and repetitive way:

A/ by implementing the above mentioned process, on any observation window $F_{n+1}$ there are determined:
  a said a priori first estimation of said flight parameter, being calculated with the help of explanatory variables being observed on said observation window $F_{n+1}$ and a coefficient vector being estimated on the previous observation window $F_n$; and
  a said a posteriori second estimation of said flight parameter, being calculated thru explanatory variables observed on said observation window and a coefficient vector being also estimated on such observation window $F_{n+1}$;

B/ an observed value of said flight parameter vector is determined on said observation window $F_{n+1}$; and C/ a comparison is carried out between said first and second estimations and said observed value, making possible to detect at least one failure affecting such flight parameter vector.

Advantageously, at step C/, the following sequence of successive steps is carried out:

C1/ with the help of a decision function that is applied to said first estimation, to said second estimation and to the observed value of said flight parameter, a decision value is calculated;

C2/ such decision value is compared to a threshold; and

C3/ a failure is detected when said decision value is higher than said threshold.

Moreover, advantageously:
  said threshold is determined through detection probabilities and false alarm; and
  at step C3/, a failure is detected when said decision value is higher than said threshold during a confirmation duration.

The present invention further relates to a second automatic detection method for detecting a malfunction of sensors in the aircraft.

According to the invention, such second method is remarkable in that:

A/ the development of the coefficients in the PLS regression, calculated by means of explanatory variables and the observed parameter is determined by implementing the above mentioned process; and B/ the development of such coefficients so as to be able to detect a malfunction is analyzed upon a development change of such coefficients.

In a first variation:
  at previous step A/, thru components of the coefficient vector, a criterion is calculated, which is representative of the intra-vectorial development of said coefficient vector; and
  at step B/, such criterion is compared to a predetermined value and a malfunction is detected when such criterion is higher than said predetermined value during a confirmation duration.

Moreover, in a second variation:
  at step A/, a criterion being representative of the statistics of said coefficients is calculated with the help of the coefficient vectors; and
  at step B/, such criterion is compared to a predetermined value and a malfunction is detected when such criterion is lower than said predetermined value during a confirmation duration.

The present invention also relates to an automatic estimation device, in real time, of a flight parameter vector used by an aircraft system, in particular an electrical flying order system.

According to the invention, said detection device is remarkable in that it comprises:
  means to receive the observed values from a plurality of explanatory values;
  means to estimate, on an observation window, a coefficient vector allowing a linear relationship to be determined between the flight parameter vector being searched and said explanatory values, relating to a linear modeling, by implementing a PLS regression;
  means to use such estimated coefficient vector so as to calculate, with the help of said linear modeling, an estimated value of said flight parameter vector; and
  means to transmit the so-estimated value to user means.

Such a device is advantageous, since it does not need the installation of new sensors or specific gauges. Moreover, it can be embedded in a flight computer and allows to supply, in real time, with a sufficient precision for the related application, estimations of some flight parameters.

The present invention further relates a first automatic detection assembly for a failure affecting at least one flight parameter vector used by an aircraft system, in particular an electrical flying order system. Such detection assembly comprises:
  one device such as the one above mentioned, to determine:
  a said a priori first estimation of said flight parameter; and
  a said a posteriori second estimation of said flight parameter;
  means to determine an observed value of said flight parameter vector; and means to perform a comparison between said first and second estimations and said observed value, thereby allowing to detect a failure affecting such flight parameter vector.

Furthermore, the invention comprises a second automatic detection assembly for the malfunction of a aircraft sensors, comprising:

one device such as the one above mentioned to determine the development of the coefficients of the PLS regression being calculated with the help of explanatory variables and the observed parameter; and means to analyze the development of such coefficient so as to be able to detect a malfunction upon a development change for such coefficients.

The present invention also relates to:

an aircraft system, in particular a electrical flying order system including a device and/or an assembly such as the ones above mentioned; and an aircraft, in particular a transport airplane, being equipped with one system, one device and/or an assembly such as above mentioned.

BRIEF DESCRIPTION OF THE DRAWINGS

The Figures of the accompanying drawings will make well understood how the invention can be implemented. On such Figures, identical references denote similar elements.

DETAILED DESCRIPTION

Figure 1:
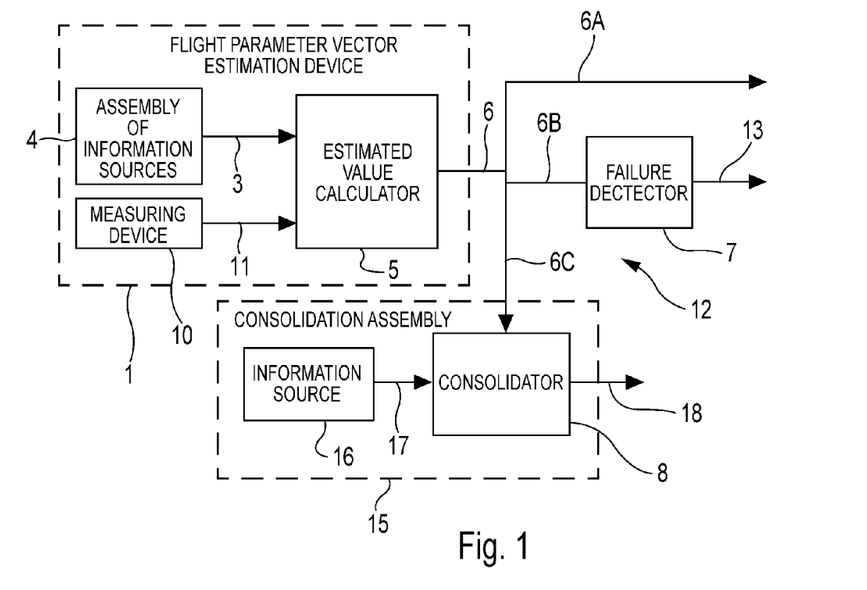
FIG. 1 is the block diagram of a flight parameter vector estimation device according to the invention.

As shown in FIG. 1, a flight parameter vector estimation device 1 according to the invention and schematically represented on FIG. 1 is intended to automatically estimate, in real time, a flight parameter vector being used by a system of an aircraft AC, in particular an electrical flying control system 20.

According to the invention, the device 1 that is embedded on the aircraft AC comprises:

a (link 3) transmitting an explanatory value signal 3 received by an estimated value calculator 5 where the explanatory value signal 3 includes observed explanatory values. The observed explanatory values are selected from a plurality of explanatory values by an assembly of information sources, which is more detailed hereinunder. An observed explanatory value represents a flight parameter (acceleration, incidence, etc.) of the aircraft AC, where at least one of the observed explanatory values is used in the processings implemented in the present invention;

the estimated value calculator 5 which is configured to generate a coefficient vector from an observation window $F_n$. (As more detailed hereinunder, a coefficient vector enables a linear relationship to be determined between the flight parameter vector being searched and the observed explanatory values, using linear modeling by implementing a regression PLS (for "Partial List Squares"); the estimated value calculator 5 being further configured to generate the estimated coefficient vector to calculate, using the linear modeling, an estimated value of the flight parameter vector; and a series of links that transmit estimated value signals 6A, 6B, and 6C via an initial estimated value signal 6 stemming from the estimated value calculator 5 where each of the estimated value signals 6A, 6B and 6C include the estimated value to a failure detector 7 and a consolidator 8 further detailed hereinunder.

Thus, the device 1 according to the invention is able to estimate, in real time, in a quick and precise way and at reduced post, a flight parameter vector used in the control of the aircraft AC, and particularly in the development of the piloting laws.

Moreover, the device 1 also includes the assembly of information sources 4 to measure on the aircraft AC the values being used to obtain the observed explanatory values. The observed explanatory values are directly measured, calculated from measurements, or consolidated from other explanatory values.

The implementation of the present invention, being described in details hereinunder, does not need the installation of new sensors or specific gauges, the device 1 being able to use an assembly 4 of information sources, being already present on the aircraft AC. It can in particular be implemented in a flight computer and allows to provide, in real time, with a sufficient precision for the related applications, estimations of some flight parameters.

A flight parameter vector includes at least one flight parameter value. The flight parameter vector includes a plurality of successive samples of a flight parameter value where the plurality of successive samples is determined from the observation window. The flight parameter vector may also include a plurality of flight parameter values extracted from a plurality of information sources such as sensors positioned on the aircraft. In such a case, the flight parameter vector may include N samples and is then defined under the form of a matrix. The flight parameter vector may also include flight parameter values from a plurality of flight parameters.

In a preferred embodiment, the estimated value calculator 5 is further configured to perform iterative processings, more detailed hereinunder, by using the PLS regression and observed explanatory values (i.e. measured or possibly consolidated) from the flight parameter vector. To this end, the device 1 also includes a measuring device 10 that also transmits an explanatory value signal 11 via a link to the estimated value calculator 5 so as to generate and provide the observed explanatory values from the flight parameter vector.

It is to be noticed that the estimated flight parameter vector according to the invention can specifically be used:

in addition to measured or calculated values of such flight parameter, when transmitted to computers, etc., not shown, via the estimated value signal 6A;

by the failure detector 7, that with the device 1 collectively define a failure detection assembly 12 which is configured to indicate a failure via a failure signal 13 transmitted via a link; and/or by the consolidator 8 to extend the availability of the flight parameter(s) being considered.

Usually, the consolidator 8 is part of a consolidation assembly 15 that includes an information source 16. The information source 16 generates a redundant value signal 17 transmitted via a link to the consolidator 8 and provides redundant values of the flight parameter being considered.

The consolidator 8 uses the estimated values generated by the device 1 and the redundant values being received from the information source 16 so as to determine, on a usual way, a consolidated value of the flight parameter which can be transmitted by a link via a flight parameter signal 18.

Figure 2:
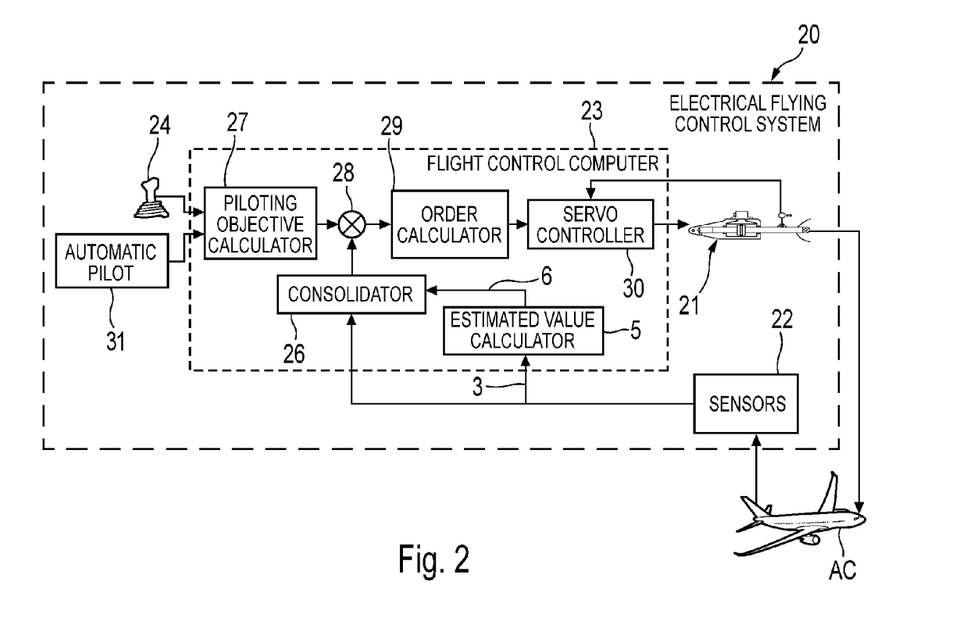
FIG. 2 schematically illustrates an electrical flying control system of an aircraft comprising a device according to the invention.

Furthermore, in a preferred embodiment, the device 1 is part of an electrical flying control system 20 of an aircraft AC, in particular a flying transport airplane, such as represented on FIG. 2. Although, for clarity and comprehensive facility reasons, the system 20 is represented besides the aircraft AC on FIG. 2 it is of course embedded on the latter.

On a usual way, such electrical flying order system 20 comprises:
- at least one rudder bar (aileron, spoiler, depth or direction rudder) that is mobile and the position of which, with respect to the aircraft AC, is adjusted by at least one actuator 21;
- said actuator 21 adjusting the position of the rudder as a function of at least one actuating order being received;
- sensors 22; and
- a flying control computer 23 that develops an actuating order for the rudder, which is transmitted to the actuator 21, from a control order calculated for example from the action of the pilot on control stick 24 or a piloting set-point received from the automatic pilot 31.

Such flight control computer 23 can generally comprise:
- a consolidator 26;
- a piloting objective calculator 27;
- a comparator 28;
- an order calculator 29; and
- a servo controller 30

The computer 23 acquires a piloting set-point which is given by the position of the control members in a manual piloting mode (with the help of the control stick 24 and a rudder bar) or by the automatic pilot 31 in an automatic piloting mode, and the computer translates the set-point into a piloting objective (using piloting objective calculator 27).

Such piloting objective is then compared (using comparator 28) to the real condition of the aircraft AC, which is obtained thru measurements performed by sensors 22 (anemometric, clinometric and inertial) that provide the current values of flight parameters (such as acceleration, incidence, etc.). The result is used to calculate, thru piloting laws (using order calculator 29), a position servo set-point for the rudders of the aircraft. The application of a servo controller 30 on an actuator 21 connected to a rudder allows the latter to be adjusted in the desired position and thus to influence the trajectory of the aircraft AC.

The device 1 can be integrated into the system 20, as shown in FIG. 2. In such a case, the estimated value calculator 5 of the device 1 directly uses the values received from the sensors 22 (or possibly from the consolidator 26) and transmit the performed estimation to the consolidator 26 (or possibly to the comparator 28).

The estimation implemented by the estimated value calculator 5 according to the present invention will be described below.

The invention thus envisages at least one flight parameter y to be estimated thru q different flight parameters $(x_1, x_2, \ldots, x_q)$, so-called explanatory variables. It is also possible to formalize the problem on the following way: let us consider a system with one output (the parameter y to be estimated) and q inputs $(x_1, x_2, \ldots, x_q)$, namely the explanatory variables.

The inputs and the outputs are observed on a finite horizon of N samples (the computers being consider being of a digital type).

The observation window is denoted $F_n = [n-N+1, \ldots, n]$, n being the current sampling time.

It is denoted:
$y(n) = [y(n) y(n-1) \ldots y(n-N+1)]^T$, the vector of N lines of the samples of the parameter y being measured by one of the sensors on the observation window, the exponent "" indicating the transpose of the vector; and $X(n) = [x_1(n) x_2(n) \ldots x_q(n)]$ the input matrix of N lines and q columns of the samples of the q explanatory variables measured on the observation window, with $x_1(n) = [x_i(n) x_i(n-1) \ldots x_i(n-N+1)]^T$ and $i = 1, \ldots, q$.

It is tried to establish a linear relationship between the parameter and the explanatory variables, i.e. it is tried to find the coefficient vector $b = [b_1 \ldots b_q]^T$ such that:

$$y = Xb + e$$

wherein e, a vector of N lines, represents the model error also called the reconstruction error.

The estimation is performed on the observation window $F_n$ and lead to an estimated coefficient vector $b(n) = [b_1(n) \ldots b_q(n)]^T$ minimizing the error power on the observation window and meeting the following equation Eq1:

$$y(n) = X(n)b(n) + e(n)$$

wherein $e(n) = [e(n) e(n-1) \ldots e(n-N+1)]^T$

It is important to note that such a modeling principle can apply, for a same flight parameter, to each of the sensors supplying observations of such parameter ($y_i$ ($i = 1, \ldots s$) or to a consolidated value $y_c$).

Moreover, such linear modeling principle entre the q inputs being observed on a window of N samples and the output y representing a flight parameter to be estimated can also be easily generalized to the case of a flight parameter vector. In such a case, a vector y is no longer considered, but a matrix Y made of the r flight parameters to be estimated on a horizon of N samples:

$Y(n) = [y_1(n) y_2(n) \ldots y_r(n)]$ being the matrix of parameters with N lines and r columns, with $y_i(n) = [y_i(n) y_i(n-1) \ldots y_i(n-N+1)]^T$ and $i = 1, \ldots, r$.

Also, in the equation Eq1, the coefficients of the linear model are grouped together, no longer in a vector, but in a matrix of q lines and r columns. However, with no loss of generality, hereinunder, the case of an only one output will be detailed to simplify the explanations. The method is also easily generalized to the case of r outputs.

The solution is obtained via a least squares method being adapted to minimize the error power between the actual output y and the estimated output $\hat{y} = Xb$.

The PLS regression (for "Partial Least Squares") is used, which is an alternative to the usual least squares method, and which is not very expensive in resources (calculation power and memory at the level of the computers).

In the absence of anomalies, the model follows the development of the flight parameter y. This allows the short term prediction of such parameter to be envisaged from the knowledge of the estimated model. The coefficients b(n) calculated by the PLS regression on the window $F_n$, thru the explanatory variables X(n) et the parameter y(n) being observed, will enable to predict the parameter on the window $F_{n+1}$ according to:

$$\tilde{y}(n+1) = X(n+1)b(n).$$

Such prediction $\tilde{y}(n+1)$ is an a priori estimation of $y(n+1)$ calculated from $b(n)$. Such a priori estimation can be compared to an a posteriori estimation calculated from $b(n+1)$ being defined by:

$$\hat{y}(n+1) = X(n+1)b(n+1)$$

wherein $b(n+1)$ represents the vector of the coefficients calculated by the regression PLS on the window $F_{n+1}$ thru the explanatory variables $X(n+1)$ and the parameter $y(n+1)$ being observed. There are thus obtained two estimations of $y(n+1)$.

These a priori and a posteriori estimations can relate to $y(n+1)$, as detailed in the above mentioned expressions, but can also be easily extended to a larger horizon to estimate $y(n+i)$.

The failure detection (implemented by the failure detector 7) is based on the comparison of both such estimations $\tilde{y}(n+1)$ and $\hat{y}(n+1)$ of the observed parameter $y(n+1)$ (received from the measuring device 10 for example) and is explained hereinunder.

First, the PLS regression principle will be presented.

To simplify the explanations, the annotations being used in the following omit the indication of the current time n: thus, $X(n), y(n), b(n)$ will be denoted $X$, $y$ and $b$.

La PLS regression allows the following system to be solved:

$$y = Xb + e$$

with no explicit matricial inversion. To this end, y and the columns of X are projected into a same dimension space $a \leq q$, the number of explanatory variables. Thus, we are looking for the matrix T (N lines, a columns, $a \leq q$), the matrix V (q lines, a columns) and the vector c (a lines) such that:

$$\begin{cases} X = TV' + R_x \\ y = Tc + r_y \end{cases}$$

and such that the residue matrix $R_x$ and the residue vector $r_y$ are minimum.

The PLS regression is an iterative algorithm enabling to do so.

The first step of the PLS regression consists in calculating $t_1$ representing the first column of T according to:

$$t_1 = \frac{Xw_1}{w_1' w_1}$$

with $w_1$ being a vector of q lines:

$$w_1 = \frac{X'y}{y'y}$$

Afterwards, the regression of X and y on such first component $t_1$ is carried out:

$$\begin{cases} X = t_1 v_1' + R_{x1} \\ y = t_1 c_1 + r_{y1} \end{cases}$$

with $v_1$ being the first column of V and $c_1$ the first component of the vector c. The calculation of $v_k$ and $C_k$ is explained in the algorigram of FIG. 3, whatever k. If the reconstruction error is judged as too large, a new component $t_2$ is calculated from the residues $R_{x1}$ and $r_{y1}$ two new models are established, with two components:

$$\begin{cases} X = t_1 v_1' + t_2 v_2' + R_{x2} \\ y = t_1 c_1 + t_2 c_2 + r_{y2} \end{cases}$$

in which expressions $t_2$ and $v_2$ represent respectively the second columns of T and V and $c_2$ the second component of the vector c.

The procedure is repeated by inserting new components and by establishing a new model of k components until the reconstruction error is acceptable by the user. It will be noticed $a \leq q$ as the final number of components. Thus, the a posteriori estimation $\hat{y}$ is expressed on a simple way (according to the following equation Eq2):

$$\hat{y} = \sum_{k=1}^{a} c_k t_k$$

Moreover, the coefficients b of the linear model can also be obtained on an iterative way. At each iteration of an index k, the component $t_k$ is defined from $X_{k-1}$ by the relationship:

$$t_k = \frac{X_{k-1} w_k}{w_k' w_k}$$

with:

$$X_0 = X$$

$$X_k = X_{k-1} - t_k v_k'$$

The components $t_k$ can also be expressed as a function of X (according to the following equation Eq3):

$$t_k = X w_k^*$$

wherein the vectors $w_k^*$ are linked to the vectors $w_k$ thru the relationship:

$$w_1^* = w_1$$

$$w_k^* = \prod_{j=1}^{k-1}(I - w_j v_j') w_k$$

for k>1

The $w_k^*$ can be calculated by recurrence:

$$w_1^* = w_1$$

$$w_k^* = w_k - w_k^* v_{k-1}' w_k$$

The equations Eq2 and Eq3 can be written:

$$\hat{y} = \sum_{k=1}^{a} c_k X w_k^* = X \sum_{k=1}^{a} c_k w_k^*$$

This allows giving the expression of the coefficients b:

$$b = \sum_{k=1}^{a} c_k w_k^*$$

Figure 3:
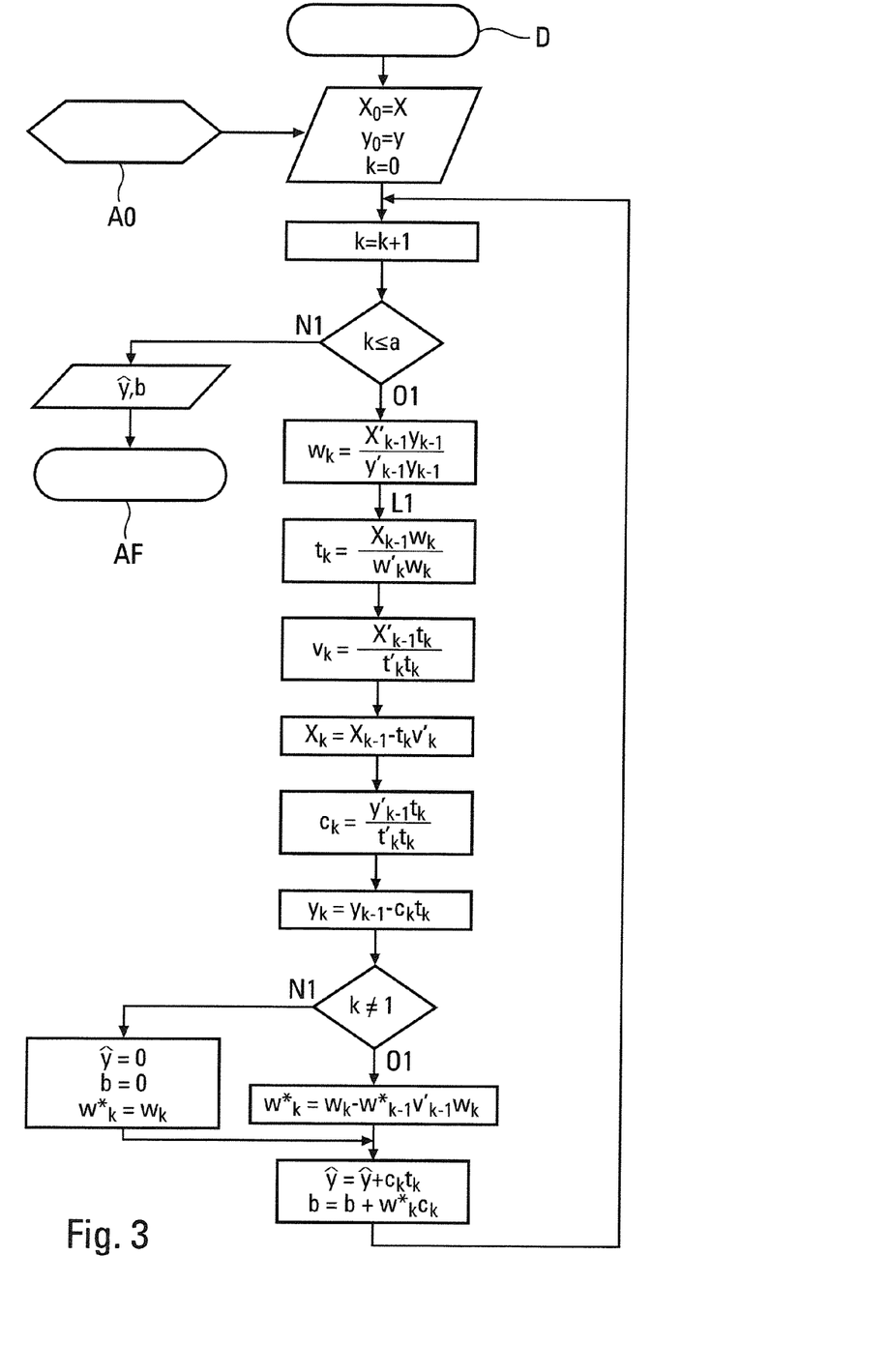
FIG. 3 schematically illustrates a linear regression algorithm being used for implementing the present invention.

The PLS regression principle above described is an iterative algorithm as explained in the algorigram of FIG. 3, wherein the following annotations are used:
k Index of the pending iteration;
$X_k$ Input matrix, N lines, q columns on iteration k;
$y_k$ Output vector, N lines on iteration k;
$b_k$ Vector of the coefficients such as $y_k = X_k b_k$ on iteration k;
a Number of PLS components being retained, lower than or equal to q;
$w_k$ Vector of q lines, regression coefficients of $y_{k-1}$ in the regression of the j-th column of $X_{k-1}$ on $y_{k-1}$;
$w_k^*$ Vector of q lines intervening in the update of b;
$t_k$ Vector of N lines, regression coefficients of $w_k$ in the regression of the i-th line of $X_{k-1}$ on $w_k$;
$v_k$ Vector of q lines, regression coefficients of $t_k$ in the regression of the j-th column of $X_{k-1}$ on $t_k$;
$c_k$ Regression coefficient of $y_{k-1}$ on $t_k$; and
$\hat{y}$ Estimation of the PLS regression.

Moreover, on FIG. 3:
O1 corresponds to "yes" and N1 to "no";
A0 illustrates the set of data being entered;
D indicates the start of the algorithm of the PLS regression;
AF indicates the end of such algorithm; and
in L1, $w_k$ is normalized to 1.

Furthermore, as regards the failure detection strategy (implemented by the failure detector 7), it is based, at a given time n+1, on the comparison of the two a priori $\tilde{y}(n+1)$ and a posteriori $\hat{y}(n+1)$ estimations and of the observed value $y(n+1)$.

Both following hypotheses are defined:
$H_0$: absence of a malfunction; and
$H_1$: presence of a malfunction.

The decision between these two hypotheses uses a function F of both estimations and of the observed value, according to the following rule:

$$F(\tilde{y}(n+1), \hat{y}(n+1), y(n+1)) \underset{H_0}{\overset{H_1}{\gtrless}} \lambda$$

with $\lambda$ being a threshold value to be defined. If the function F, so-called test statistic or decision function, is higher than the threshold, then the hypothesis $H_1$ is verified, i.e. a malfunction (or failure) is detected by the failure detector 7), as represented on FIG. 5 (with O2 for yes).

Figure 5:
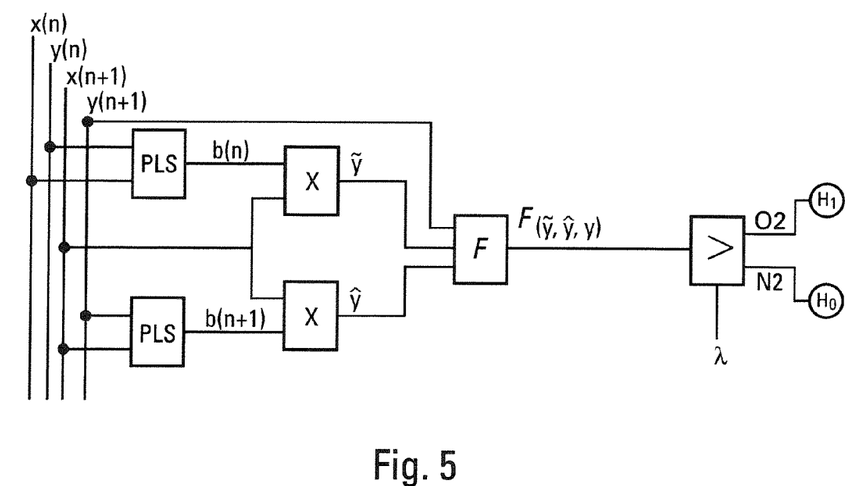
FIG. 5 is a block diagram for a failure detector.

If the function F is lower than the threshold, then the hypothesis $H_0$ is verified, and the failure detector 7 determines there is an absence of malfunction (or failure), as represented on FIG. 5 (with N2 for no).

The selection of the threshold A is carried out as a function of probabilities about detection ($P_D$) and false alarm ($P_{FA}$).

Generally, it is convenient to fix one of the two probabilities, for example $P_{FA}$, thereby enabling to calculate a threshold and to infer therefrom the other probability $P_D$. It is then possible to plot a curve COR (for Operational Characteristic of reception) representing the detection probability $P_D$ as a function of the false alarm probability $P_{FA}$ for different threshold values. Such a curve allows the detection strategy to be characterized and different possible functions F to be compared.

Figure 4:
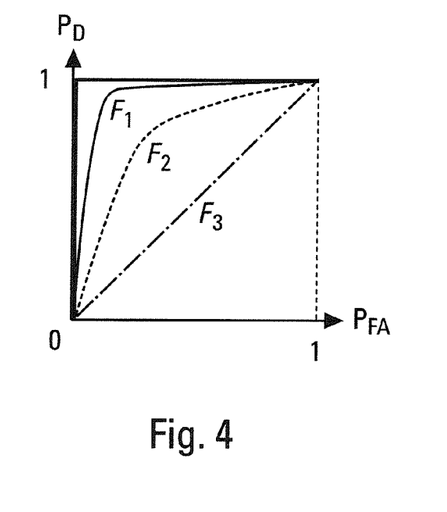
FIG. 4 is a graph showing COR type plots for different decision functions. Such COR (for Operational Characteristic of the Receiver) plots represent the detection probability at a function of the false alarm probability.

Thus, as illustrated on FIG. 4, the function $F_1$ leads to better performances than $F_2$. The function $F_3$ corresponds to the less performing solution, whereas the thick line curve corresponds to the ideal solution being looked for.

The overall principle of the failure detector 7 is represented on FIG. 5.

For illustration (and not limitative) sake, several expressions of the function F to be applied can be proposed.

From a priori and a posteriori estimations as previously defined, the corresponding estimation errors are calculated:

$$\tilde{e}(n+1) = y(n+1) - \tilde{y}(n+1)$$

$$\hat{e}(n+1) = y(n+1) - \hat{y}(n+1)$$

The power $\tilde{P}$ of the a priori $\tilde{e}$ error is higher than the power $\hat{P}$ of the a posteriori $\hat{e}$ error, since the latter is calculated so as to be minimum.

A first decision function, that could be proposed, only takes into account the a priori $\tilde{y}$ estimation and the observed value y:

$$F_1(\tilde{y}, y) = \tilde{P}$$

However, it can be interesting to compare such a priori estimation and the a posteriori estimation. Two other functions can thus be proposed:

$$F_2(\tilde{y}, \hat{y}, y) = \hat{P} - \tilde{P}$$

$$F_3(\tilde{y}, \hat{y}, y) = \check{P}$$

$\check{P}$ representing the power of the difference between the a priori and a posteriori estimations:

$$\check{e}(n+1) = \hat{y}(n+1) - \tilde{y}(n+1).$$

Furthermore, it will be noticed that the input parameters can take punctually aberrant values (for example due to a transmission problem at the level of the data bus), thereby leading thru a PLS regression to incoherent a priori and/or a posteriori estimations. The above mentioned detection strategy is based on a thresholding of the instantaneous value of the error power and can thus lead in such precise case to false alarms.

The establishment of a confirmation strategy allows the detection to be sturdier.

To do so, the decision function is extended to the times $\lfloor n+1 \rfloor, (n+2), \ldots, (n+T_{conf}) \rfloor$ constituting the confirmation window. Thus, if the decision function goes beyond the fixed threshold during a (predetermined) percentage of the (also predetermined) confirmation time $T_{conf}$, the malfunction is confirmed.

Furthermore, within the present invention, the PLS regression can be extended to non centered signals.

It is known that, in the case of usual least squares, it is tried to solve the following system:

$$\hat{y} = Xb.$$

If X is centered, $\hat{y}$ is the same. Now, $\hat{y}$ represents an estimation of y that should thus also be centered. It is a necessary condition to select a linear relationship.

Thus, if X and y are centered before carrying out the resolution of the least squares, or possibly thru the PLS regression, the following equation Eq4 is obtained:

$$\hat{y} - m_y \cdot 1_{\{N*1\}} = (X - M_x) b$$

avec $1_{\{N*1\}}$ being a unit vector of N lines and $M_x$ a matrix of N lines, q columns such that:

$$M_x = \begin{pmatrix} m_{x1} & \cdots & m_{xq} \\ \vdots & \ddots & \vdots \\ m_{x1} & \cdots & m_{xq} \end{pmatrix}$$

$m_y$ and $m_{xi}$ correspond to the averages of y and the i-th column of X.

The equation Eq4 becomes the following equation Eq5:

$$\hat{y} = \begin{pmatrix} x_1(n)-m_{x1} & \cdots & x_q(n)-m_{xq} & 1 \\ \vdots & \ddots & \vdots & \vdots \\ x_1(n-N+1)-m_{x1} & \cdots & x_q(n-N+1)-m_{xq} & 1 \end{pmatrix} \begin{pmatrix} b_1 \\ \vdots \\ b_q \\ m_y \end{pmatrix}$$

The centring of the outputs and the input is necessary for a good resolution of the system. However, in the present case:

centring y would eliminate some failures, including the bias type failures occurring thru an average jump; and centring X could lead to false alarms. Indeed, a (natural) average jump on the input variables can lead to an average jump on the output, which would be considered as a normal operation. Centring the inputs would lead to consider the output jump as a malfunction, and would thus cause a false alarm.

In order to remedy such problem, advantageously, a so-called adjusting input variable is added. Indeed, the equation Eq5 can also be written:

$$\hat{y} = \begin{pmatrix} x_1(n) & \cdots & x_q(n) & 1 \\ \vdots & \ddots & \vdots & \vdots \\ x_1(n-N+1) & \cdots & x_q(n-N+1) & 1 \end{pmatrix} \begin{pmatrix} b_1 \\ \vdots \\ b_q \\ m_y - \sum_{k=1}^{q} b_k m_{x_k} \end{pmatrix}$$

A linear model between y and X is looked for without previously centring them, but by inserting an extra input variable. The model being looked for is written:

$$\hat{y} = \begin{pmatrix} x_1(n) & \cdots & x_q(n) & 1 \\ \vdots & \ddots & \vdots & \vdots \\ x_1(n-N+1) & \cdots & x_q(n-N+1) & 1 \end{pmatrix} \begin{pmatrix} b_1^+(n) \\ \vdots \\ b_q^+(n) \\ b_{q+1}^+(n) \end{pmatrix}$$

with $b^+(n)=[b_1^+(n) \ldots b_{q+1}^+(n)]$ being a vector of q+1 lines. It constitutes an increased version of the vector b by adding a component. Such component represents:

$$m_y - \sum_{k=1}^{q} b_k m_{x_k}$$

with the hypothesis of a linear relationship between X and y. In the other cases, such component allows the average differences between y and Xb to be compensated.

The addition of the adjusting variable enables to look for the function minimizing the error in the set of the affine functions rather than in the one of the linear functions. The set, in which the function is looked for, is larger and thus allows a function to be found, that will give a lower or an equal reconstruction error.

Indeed, both approaches can be compared, with and without adjusting variable:

A/ without the adjusting variable, $g_1$ is looked for such that:

$$y=g_1(X)+e_1$$

avec $g_1$ being:

$$\mathfrak{R}^N \times \mathfrak{R}^q \to \mathfrak{R}^N, b \in \mathfrak{R}^q X \to Xb$$

Let us denote $G_1$ the set of the functions $g_1$; and

B/ with the adjusting variable, $g_2$ is looked for such that:

$$y=g_2(X)+e_2$$

with $g_2$ being:

$$\mathfrak{R}^N \times \mathfrak{R}^q \to \mathfrak{R}^N, b \in \mathfrak{R}^q etb_{q+1}^+ \in \mathfrak{R} X \to Xb + b_{q+1}^+ \cdot 1_{\{N*1\}}$$

Let us denote $G_2$ the set of the functions $g_2$.

The reconstruction error e is to be minimized, i.e. it is looked for $\hat{g}_1 \in G_1$ and $\hat{g}_2 \in G_2$ such that:

$$\hat{g}_1 = \arg_{g_1} \min |y - g_1(X)|^2 = \arg_{g_1} \min |e_1|^2$$

and $$\hat{g}_2 = \arg_{g_2} \min |y - g_2(X)|^2 = \arg_{g_2} \min |e_2|^2$$

The functions $\hat{g}_1$ and $\hat{g}_2$ possess q input variables and one output variable.

If the minimum error is obtained via $g_1$ then $g_2$ will fix the coefficient $b_{q+1}^+$ to 0. In such a case, $G_1$ is well included in $G_2$.

Otherwise, $g_2$ will permit the minimization of the error by proposing an affine solution rather than linear, and, in such a case, $G_1$ is still included in $G_2$.

Thus, $G_1$ is included in $G_2$, which infers:

$$\arg_{g_2} \min |e_2|^2 \leq \arg_{g_1} \min |e_1|^2$$

Consequently, $\hat{g}_2$ leads either to the same error e than $\hat{g}_1$, or to a weaker error.

Finally, the addition of the adjusting variable thus leads necessarily to a weaker (or at most equal) reconstruction error.

The device 1 according to the invention can also be applied to another detection assembly (not represented), allowing the malfunction of the sensors of the aircraft to be automatically detected.

Such automatic detection assembly includes, in addition to the device 1 (being used for determining the development of the coefficients of the PLS regression, calculated thru explanatory variables and the observed parameter), the analyzing of the development of such coefficients so as to be able to detect a malfunction upon a development change to such coefficients.

It is known that the coefficients $b^+=[b_1^+ \ldots b_q^+ b_{q+1}^+]$, being coefficients associated with the q inputs $(x_1, x_2, \ldots, x_q)$ and with the adjusting variable, present a behavior change when a malfunction occurs. It is possible to use such change so as to detect the malfunction.

Two approaches are provided: one (first) analysis of the intra-vectorial development of $b^+=[b_1^+ \ldots b_q^+ b_{q+1}^+]$ and a (second) analysis of the statistical development of the coefficients $b^+$ over the time. In the following, $b^+(n)=[b_1^+(n) \ldots b_{q+1}^+(n)]$ denotes le vector $b^+$ being calculated at the instant n.

The detection strategy (relative to the analysis of the intra-vectorial development) consists in doing the follow-up of the dispersion for the coefficients coming from the PLS regression. This amounts to evaluating on each sample a distance between the components of the coefficient vector $b^+$. A particular analysis deriving from such strategy is detailed hereinunder.

The dispersion of the vector is measured by the power thereof, that allows abrupt changes of average and variance (Eq6) to be taken into account simultaneously:

$$C_1(n) = \frac{1}{q+1}\sum_{i=1}^{q+1} b_i^{+2}(n) = \frac{\|b^+\|^2}{q+1}.$$

Other criteria are also to be envisaged, such as the criteria of the average $$\frac{1}{q+1}\sum_{i=1}^{q+1} b_i^+(n)$$

or the variance $$\frac{1}{q+1}\sum_{i=1}^{q+1}\left(b_i^+(n) - \frac{1}{q+1}\sum_{j=1}^{q+1} b_j^+(n)\right)^2,$$

but they only take into account a part of the information carried by the coefficients. Thus, for the sake of clarity, only the results associated with the criterion Eq6 are presented.

The test rule is as follows:

$$C_1(n) \underset{H_0}{\overset{H_1}{\gtrless}} seuil,$$

$H_0$ represents the hypothesis of a normal operation and $H_1$ the hypothesis of a presence of failure. We look to see if said criterion is higher than at least one threshold, and this during at least a certain confirmation time.

Furthermore, the second detection strategy consists in analyzing a change in the statistics of the coefficients $b^+$. Indeed, it can be supposed that, in the absence of a failure (hypothesis $H_0$), the vector $b^+=[b_1^+ \ldots b_q^+ b_{q+1}^+]$ follows a law $p_{H_0}(b^+)$ the parameters of which can be estimated. On the contrary, in presence of a failure (hypothesis $H_1$), the vector follows a different law $p_{H_1}(b^+)$ depending on the type of failure and the characteristics thereof.

Since a detection strategy is wished, that is adapted for any type of failure, it is of no question to characterize the different laws being possible under $H_1$, all the more because it is not sure that the set of the failures to be detected is entirely defined. Thus, the detection problem amount to testing the following hypotheses:

$H_0$:$b^+$ follows $p_{H_0}$ $H_1$:$b^+$ does not follow $p_{H_0}$

Supposing that the laws under $H_0$ and $H_1$ are sufficiently distant, a test law may be the following (Eq7):

$$p_{H_0}(b^+) \underset{H_1}{\overset{H_0}{\gtrless}} seuil_1$$

or on an equivalent way by using the log-likelihood (Eq8):

$$\sum_{i=1}^{q+1} \ln\left(p_{H_0}^{(i)}(b^+)\right) \underset{H_1}{\overset{H_0}{\gtrless}} seuil_2$$

Any other function $C_2(p_{H_0}(b^+))$ from $p_{H_0}(b^+)$ can be used.

We look if the criterion is lower or higher than at least one threshold during at least a certain confirmation time. The threshold should be selected depending on the desired false alarm and non detection probabilities.

Insofar as the hypothesis $H_1$ is not entirely specified ($p_{H_1}$ not known), only the false alarm probability can be fixed, thereby determining the test threshold:

$$P_{FA} = \iint_{D_1} p_{H_0}(b^+)$$

wherein $D_1$ corresponds to the part of $\mathfrak{R}^{q+1}$ meeting $H_1$ in Eq7, i.e. the set of the components of $b^+$ such that $p_{H_0}(b^+)$ <$seuil_1$.

Thus, the calculation of the $P_{FA}$ et the threshold occurs on the distribution queue $p_{H_0}$.

In order to determine the type of law followed by the vector $b^+$ under $H_0$, it is supposed that the different components are independent:

$$p_{H_0}(b^+) = \Pi_{i=1}^{q+1} p_{H_0}^{(i)}(b_i^+),$$

with $p_{H_0}^{(i)}$ being the margin laws of the different components.

The different margin laws are selected amongst the known laws (or an assembly of known laws) so as to be the closest possible to the histogram of the coefficients originating from the PLS regression.

In general, the known laws that can approximate the $b^+$ statistic are function of two parameters, average and variance. The principle stays however the same with more complex and more general laws with three parameters, and the detection algorithm should be adapted consequently.

Figure 6:
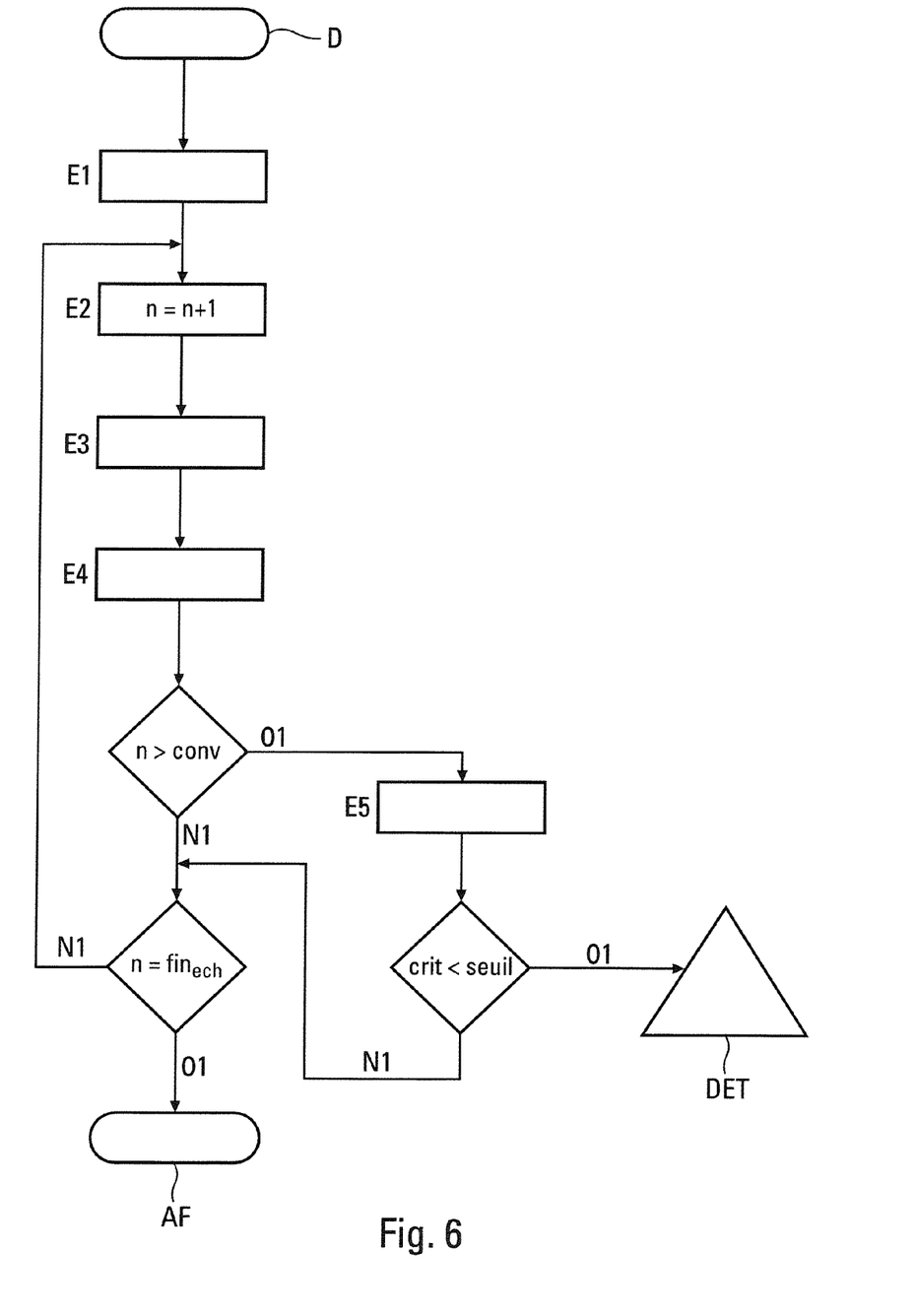
FIG. 6 schematically illustrated a detection algorithm being used by a particular embodiment alternative for a detection assembly according to the invention.

The detection algorithm is presented by the algorigram (schematic representation of the process being implemented in real time) of FIG. 6 in five steps (E1 to E5) disclosed hereinunder.

On such FIG. 6:

O1 corresponds to "yes" and N1 to "no";

D denotes the start of the detection algorithm;

AF denotes the end of such algorithm;

DET corresponds to the detection;

conv corresponds to the convergence time of the calculated average;

$fin_{ech}$ to the last point of the sample;

crit corresponds to the criterion of the strategy used for the detection; and threshold corresponds to the detection threshold.

In the first time (step E1), the parameters for the calculation of the detection criterion, namely the average and the standard deviation of each component of the vector $b^+(n)$ of the PLS, are initialized.

It is taken account of the following elements:

$$n=0$$

$$m_n^{(i)}=0$$

$$m2_n^{(i)}=1, i=1,\ldots, q+1.$$

$$\sigma_n^{(i)}=\sqrt{m2_n^{(i)}-m_n^{(i)^2}}$$

Thus, $m_n=0$ where $m_n$ is a vector of q+1 lines of the averages of each component of the vector $b^+$ at the time $n:m_n=(m_n^{(1)} \ldots m_n^{(q+1)})^T$.

$m2_n=(1 \ldots 1)^T$ is a vector of q+1 intermediate lines allowing for the calculation of the standard deviation.

$\sigma_n=(1 \ldots 1)^T$ is a vector of $q_+1$ lines of the standard deviations for each component of the vector $b^+$ at the time $k:\sigma_n=(\sqrt{m2_n^{(1)}-(m_n^{(1)})^2} \ldots \sqrt{m2_n^{(q)}-(m_n^{(q)})^2})^T$ At step E2, the time n is considered.

At step E3, the vector $b^+(n)$ of q+1 lines of the coefficients from the PLS regression at the time n is calculated.

At step E4, the new values of the parameters of the probability law are updated. In the example being considered, it is a weighted average. Generally, such updating is performed at each time on the following way (Eq9):

$$m_n=m_{n-1}\lambda_1+b_n^+(1-\lambda_1)$$

with $0 \le \lambda_1 \le 1$.

However, at the very start, after initialization, such updating cannot be considered as valuable and usable for the detection as long as the value has not sufficiently converged. In practice, it is considered that the average value calculated by Eq9 being valuable when the calculated average has reached at least 90% of the desired value. In order to be able to calculate the necessary convergence time, the hypothesis is made that during the convergence time the $b^+(n)$ are constant. The equation Eq9 becomes:

$$m_n = m_0\lambda_1^n + (1-\lambda_1)\sum_{j=0}^{n-1} b^+(n-j)\lambda_1^j$$

$$\approx m_0\lambda_1^n + b^+(n)\sum_{j=0}^{n-1}(1-\lambda)\lambda_1^j.$$

In the present case, $m_0=0$. Thus, finding the convergence time amounts to determining the minimum value of n for which $\Sigma_{j=0}^{n-1}(1-\lambda)\lambda_1^j$ goes beyond 90%. An initialization is performed before starting the malfunction detection and going thru the step E5.

At step E5, following elements are taken into account:

$$m_n^{(i)}=m_{n-1}^{(i)} \times \lambda_1 + b^{+(i)}(n)(1-\lambda_1)$$

$$m2_n^{(i)}=m2_{n-1}^{(i)} \times \lambda_1 + b^{+(i)^2}(n)(1-\lambda_1), i=1,\ldots, q+1.$$

$$\sigma_n^{(i)}=\sqrt{m2_n^{(i)}-m_n^{(i)^2}}$$

At step E5, the detection criterion is calculated, for example the one defined by Eq8.

In order to avoid the false alarms related to aberrant values, the average of such criterion is done on a certain number of confirmation points $n_{conf}$. Further to switching to the logarithm, such average is approximated by the maximum over the confirmation time.

The rule mentioned in Eq7 enables to decide either there is or not a detection (highlighted by DET on FIG. 6).

The invention claimed is:

1. A method of automatically estimating a flight parameter vector when in flight used by an electrical flying control system of an aircraft, the method comprising:
   selecting, by an assembly of information sources, a plurality of observed explanatory values from a plurality of explanatory values, wherein each explanatory value represents a flight parameter of the aircraft;
   estimating, by an estimated value calculator, a current coefficient vector in a current observation window and a previous coefficient vector in a previous observation window, wherein the current observation window includes a sampling of the observed explanatory values for a most recent period of time and the previous observation window includes a sampling of the observed explanatory values for a previous period of time;
   calculating a first estimation of an estimated flight parameter value from the plurality of observed explanatory values observed during the current observation window and the previous coefficient vector, and a second estimation of the estimated flight parameter value from the plurality of observed explanatory values observed during the current observation window and the current coefficient vector, wherein the first and second estimations of the estimated flight parameter value are calculated by implementing a linear relationship between the respective estimated flight parameter value and the respective plurality of observed explanatory values by a Partial Least Squares PLS regression;
   comparing the first and second estimations of the estimated flight parameter value and an observed flight parameter vector to detect at least one failure impacting the estimation of the flight parameter vector; and
   estimating the flight parameter vector when in flight by using the current coefficient vector in a calculation of the flight parameter vector to minimize error in the flight parameter vector.

2. The method according to claim 1, wherein a flight parameter vector includes at least one estimated flight parameter value that is associated with at least one flight parameter.

3. The method according to claim 1, wherein the observation window includes a plurality of successive samples.

4. The method according to claim 1, further comprising:
   accommodating a plurality of non-centered signals by implementing an adjusting input variable.

5. The method according to claim 1, wherein the comparing of the first and the second estimations and the observed flight parameter vector further comprises:
   calculating a decision value from the first estimation, the second estimation, and the plurality of observed explanatory values;
   comparing the decision value to a threshold; and
   detecting a failure when the decision value is higher than the threshold.

6. The method according to claim 5, wherein the threshold is determined based on detection and false alarm probabilities.

7. The method according to claim 5, wherein the detecting of a failure further comprises:
   detecting when the decision value is higher than the threshold during a confirmation time.

8. The method according to claim 1, further comprising:
   detecting a malfunction based upon a development change in the current coefficient vector.

9. The method according to claim 8, wherein detecting a malfunction further comprises:
   calculating a criterion that is representative of an intra-vectorial development of the current coefficient vector; and
   comparing the criterion to a predetermined value so that the malfunction is detected when the criterion is higher than the predetermined value during a confirmation duration.

10. The method according to claim 8, wherein detecting a malfunction further comprises:
    calculating a criterion that is representative of statistics associated with the current coefficient vector; and
    comparing the criterion to a predetermined value so that the malfunction is detected when the criterion is lower than the predetermined value during a confirmation duration.

11. An automatic estimation device for a flight parameter vector when in flight used by an electrical flying order system of an aircraft, the device comprising:
    an assembly of information sources that select a plurality of observed explanatory values from a plurality of explanatory values and transmit the plurality of observed explanatory values to an estimated value calculator, wherein each explanatory value represents a flight parameter of the aircraft; and
    the estimated value calculator, which is connected to the assembly of information sources by a link and which performs the following functions:
       estimate a current coefficient vector in a current observation window and a previous coefficient vector in a previous observation window, wherein the current observation window includes a sampling of the observed explanatory values for a most recent period of time and the previous observation window includes a sampling of the observed explanatory values for a previous period of time,
       calculate a first estimation of an estimated flight parameter value from the plurality of observed explanatory values observed during the current observation window and the previous coefficient vector, and a second estimation of the estimated flight parameter valude from the plurality of observed explanatory values observed during the current observation window and the current coefficient vector, wherein the first and second estimations of the estimated flight parameter value are calculated by implementing a linear relationship between the respective estimated flight parameter value and the respective plurality of observed explanatory values by a Partial Least Squares PLS regression;
       compare the first and second estimations of the estimated flight parameter value and an observed flight parameter vector to detect at least one failure impacting the estimation of the flight parameter vector; and
       estimate the flight parameter vector when in flight by using the current coefficient vector in a calculation of the flight parameter vector to minimize error in the flight parameter vector.

12. The device according to claim 11, further comprising:
    a measurement device that measures on the aircraft the plurality of explanatory values from which the plurality of observed explanatory values is selected, the measurement device being connected to the estimated value calculator by a link.

13. The device according to claim 11, further comprising:
    a detector configured to detect a malfunction is based upon a development change in the current coefficient vector.

* * * * *